United States Patent

[11] 3,579,899

| [72] | Inventor | Amos F. Hannah<br>Hollister, Calif. (Star Rte. Box 239, Snelling, Calif. 95369) |
|---|---|---|
| [21] | Appl. No. | 759,415 |
| [22] | Filed | Sept. 12, 1968 |
| [45] | Patented | May 25, 1971 |

[54] TOY HAY BALER
4 Claims, 7 Drawing Figs.

[52] U.S. Cl. ...................................................... 46/39,
46/202, 46/243, 100/179
[51] Int. Cl. ...................................................... A63h 33/30
[50] Field of Search ........................................... 46/39, 40,
201, 202, 243; 100/179, 188

[56] References Cited
UNITED STATES PATENTS

| 628,452 | 7/1899 | Dederick ..................... | 100/179X |
| 2,758,418 | 8/1956 | Troppe ......................... | 46/202X |

*Primary Examiner*—Louis G. Mancene
*Assistant Examiner*—Robert F. Cutting

ABSTRACT: A mechanical toy for baling hay, the toy including operative mechanism for feeding and compressing hay material within a press so to form rectangular configurated hay bales which are tied together so to retain their shape.

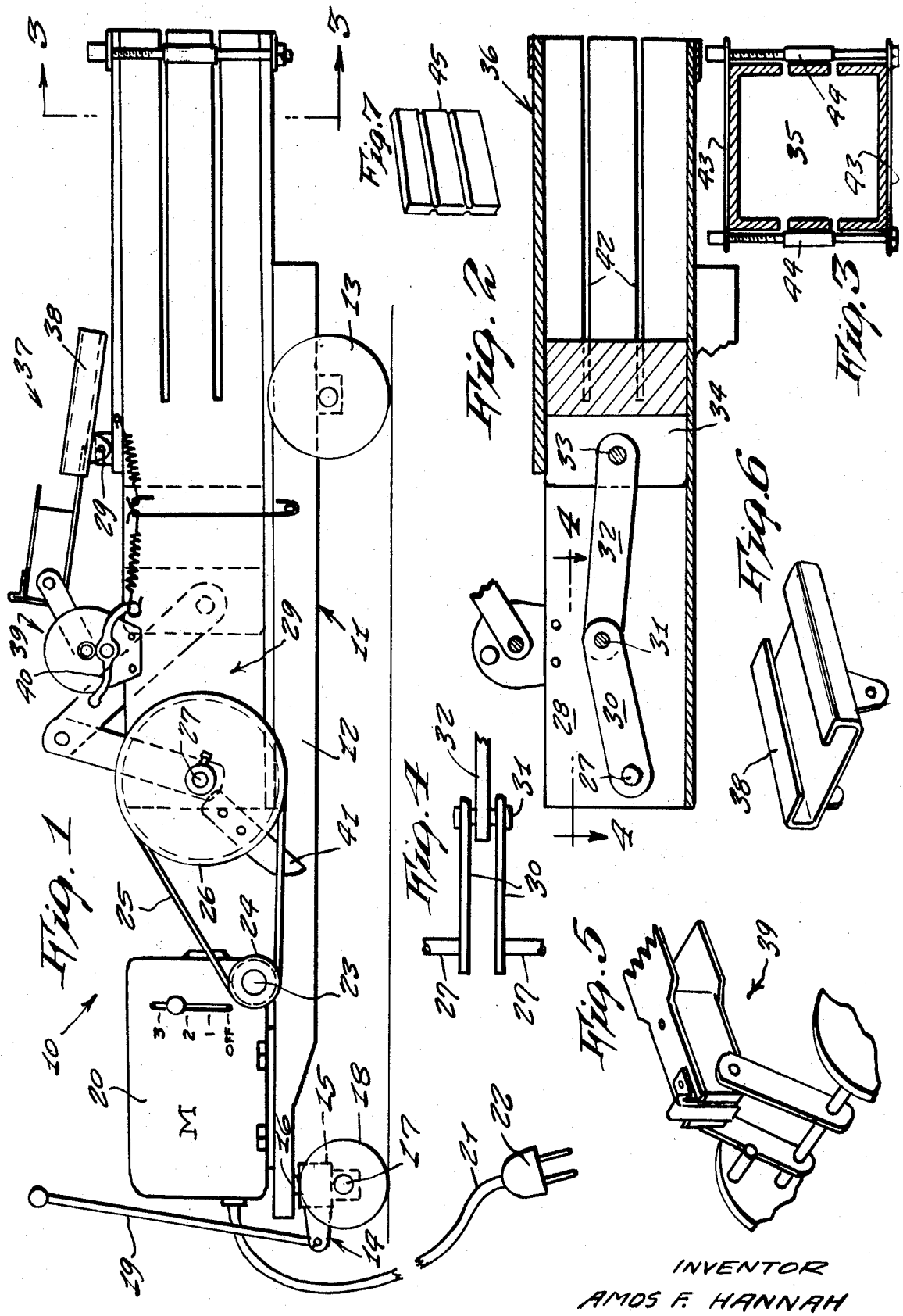
INVENTOR
AMOS F. HANNAH

TOY HAY BALER

This invention relates generally to mechanical toys. More specifically it relates to a toy hay baler.

A principal object of the present invention is to provide an improved mechanical toy which actually produces bales of hay wherein the hay may be comprised of clipped lawn grass or artificial grass such as is conventionally used in Easter baskets.

Another object of the present invention is to provide a toy hay baler wherein the bales of hay are discharged from the toy in a fully tied condition so as to retain their particular shape.

Yet another object of the present invention is to provide a toy baler which includes a hay-feeding mechanism and a hay-pressing mechanism for pressing the hay into a compact condition within a hay press.

Other objects of the present invention are to provide a toy hay baler which is simple in design, inexpensive to manufacture, rugged in construction, easy to use and efficient in operation.

These and other objects will be readily evident upon a study of the following specification and the accompanying drawing wherein:

FIG. 1 is a side elevation view of the present invention;

FIG. 2 is a fragmentary cross-sectional view thereof taken in the same plane;

FIG. 3 is a cross-sectional view taken on the lines 3—3 of FIG. 1;

FIG. 4 is a view in the direction 4—4 of FIG. 2;

FIG. 5 is a perspective view of the hay-feeding mechanism;

FIG. 6 is a perspective view of another part of the hay-feeding mechanism; and

FIG. 7 is a perspective view of a bale end block.

Referring now to the drawing in detail, the reference numeral 10 represents a toy hay baler according to the present invention wherein there is a vehicle 11 which includes a chassis 12 mounted upon a pair of rear wheels 13 and upon a front truck 14 which includes a crossbar 15 pivotable about a vertical shaft 16, the crossbar supporting an axle 17 having wheels 18 mounted thereupon, the bar 16 having a handle 19 pivotably secured thereto for pulling purposes by a child. Thus the vehicle may be steered into any desired direction.

A variable speed electric motor 20 is mounted upon the chassis 12, the motor having an electric extension cord 21 extending therefrom and being provided with a male plug 22 at its opposite end for securement into an electric socket outlet. A motor output shaft 23 has a pulley 24 secured thereto which drives an endless belt 25 that is passed around a pulley 26 secured to a shaft 27 extending transversely and supported between opposite sidewalls 28 of a vehicle body 29 mounted upon the chassis 12. One end of a lever 30 is rigidly secured to the shaft 27, the opposite end of the lever being attached pivotably free by means of a pin 31 to one end of a lever 32, the opposite end of lever 32 being attached pivotably free by means of pin 33 to a pusher block 34 which slides reciprocally back and forth within an opening 35 of a hay press 36 which forms a portion of the body 29.

A hay-feeding mechanism 37 is mounted upon the body 29, the hay feeder including a throw block 38 pivotable about transverse pin 39 stationarily mounted upon the body. The block throw is of trough configuration, as shown in FIG. 6. A feeder mechanism 39 illustrated in FIG. 5 of the drawing is associated with the block throw 38, the mechanism 39 including a control 40 which is activated by a trip lever 41 affixed to one side of the pulley 26. Thus rotation of the pulley 26 will cause the trip lever to activate the feeder mechanism.

A plurality of longitudinally extending slots 42 are provided in the sidewalls 28 of the hay press 36 so as to allow insertion of a tying string around a bale which is formed within the press. A pair of presser springs 43 are fitted against the upper and lower side of the press 36, the presser springs being urged toward each other by means of turn buckles 44.

In operative use, a bale end plate 45 is fitted into the opening 35 of the press 36 and is positioned to form an end wall at the rear end of the press, the bale end block being withheld from dropping out rearwardly by means of rotating the turnbuckles 44 so to provide insufficient space between the upper and lower walls of the press so to allow the block to pass therethrough. Hay is then delivered from the feeder through the upper opening into the press and the hay is compacted by means of the pusher block 34 which reciprocally moves back and forth so to urge the hay against the bale end block 45 while additional hay is being packed into the press. Thereafter a second bale end block 45 is positioned against the forward end of the bale thus formed, and a string is passed around the bale and its end blocks by means of passing the string through the slots 32. A long needle is advised to be used so the same may extend transversely through the press chamber 35. Thereafter a third bale end block is placed within the press chamber adjacent the second block, and hay is continued to be fed into the press chamber against the third block. Meantime the turn buckles are loosened so as to allow the first bale to be discharged from the press, after which the same are again tightened so as to prevent the third bale end block to fall outwardly therefrom, but permitting the same to be brought to the rear end of the press chamber so as to repeat the above described operation.

While various changes may be made in the detailed construction, it is understood that such changes will be within the spirit and scope of the present invention as is defined by the appended claims.

I claim:

1. In a toy hay baler, the combination of a toy vehicle including a chassis mounted upon a pair of rear wheels and upon a front truck, said front truck including a transverse bar pivotably about a vertical shaft extending downwardly from said chassis, said transverse bar supporting a transverse shaft having a pair of wheels mounted thereon, said transverse bar being pivotably secured to a pulling handle, said chassis supporting a body and a means for baling hay including a hay-feeding mechanism and a hay-pressing mechanism, and drive means for operating said hay-feeding mechanism, and electric motor of variable speed mounted on said chassis, said electric motor having an electric extension cord extending therefrom, the opposite end of said extension cord having a male plug for attachment to an electric socket outlet, said motor having an output shaft with a pulley secured thereto, said pulley being engaged by an endless belt which is passed around a second pulley secured upon a transverse shaft mounted on one sidewall of said body; and a feeding mechanism which comprises a block of troughlike configuration pivotably mounted upon the upper side of said body, said block throw being engaged by a reciprocally sliding block upon the ends of a pair of levers, said feeder mechanism being activated by means of a trip lever secured to a side of said second pulley for feeding said hay.

2. The combination as set forth in claim 1 wherein said press mechanism includes a press chamber having opposite sidewalls with extending slots in communication with a rear edge thereof, a pusher block reciprocally sliding within said chamber, said pusher block being attached pivotably free to one end of a first lever which is attached pivotably free to a second lever, said second lever being rigidly affixed to said shaft of said second pulley.

3. The combination as set forth in claim 2 wherein a pair of presser springs and turnbuckles adjustably control a rear opening of said press chamber.

4. The combination as set forth in claim 3 wherein said block has matching grooves in its body as means for separating the bales.